June 21, 1966   J. R. O'CONNELL   3,256,601
CHEESE CURD MILL
Filed June 19, 1964

3,256,601
CHEESE CURD MILL
James Robert O'Connell, Kensington, Victoria, Australia, assignor to James Bell Machinery Proprietary Limited, Kensington, Victoria, Australia, a corporation of Victoria
Filed June 19, 1964, Ser. No. 376,491
Claims priority, application New Zealand, July 12, 1963, 135,446
3 Claims. (Cl. 31—48)

This invention relates to an improved cheese curd mill, i.e. a mill for cutting the curd into small pieces prior to salting, hooping and other operations in cheddar cheese manufacture.

Main objects of the invention are to provide a generally improved curd mill which will ensure cleaner cutting of the curd with absence of bruising or tearing of the curd thereby reducing losses of fat or other constituents of the curd during milling, and is also such as can be more easily cleaned, thus ensuring the maintenance of hygienic conditions in the mill.

According to the invention, there is provided a cheese curd mill having a reciprocating cutter box, a cutter grid of stainless steel mounted in said cutter box and a smooth surface stainless steel back plate against which the curd is cut by the cutter grid, the construction being such that the cutter grid in the reciprocating movement of the cutter box stops a small distance short of the back plate.

The invention is more fully described and its advantages explained aided by reference to the accompanying drawings wherein.

Figure 1:
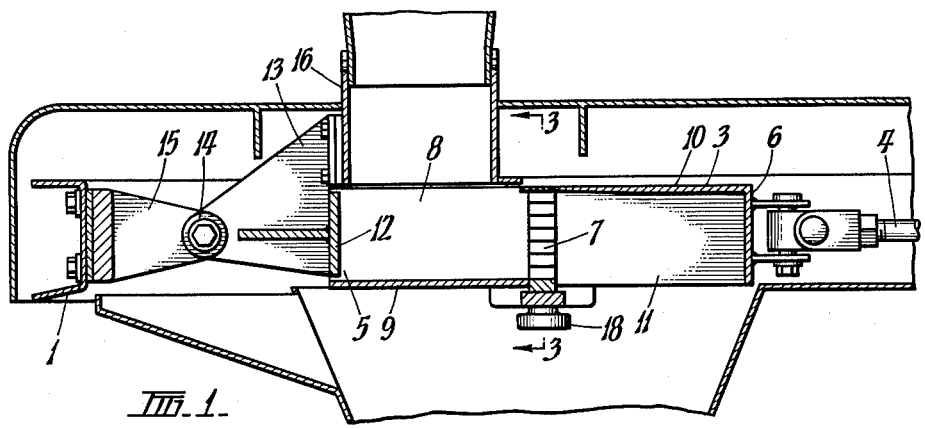
FIG. 1 is a vertical sectional side view of the improved mill.
Figure 2:
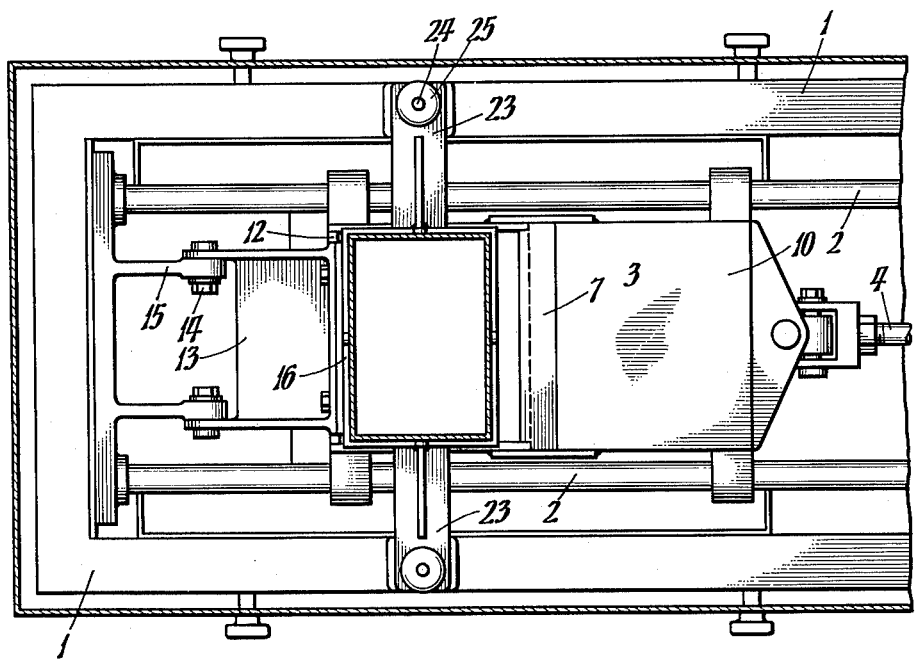
FIG. 2 is a plan view.
Figure 3:
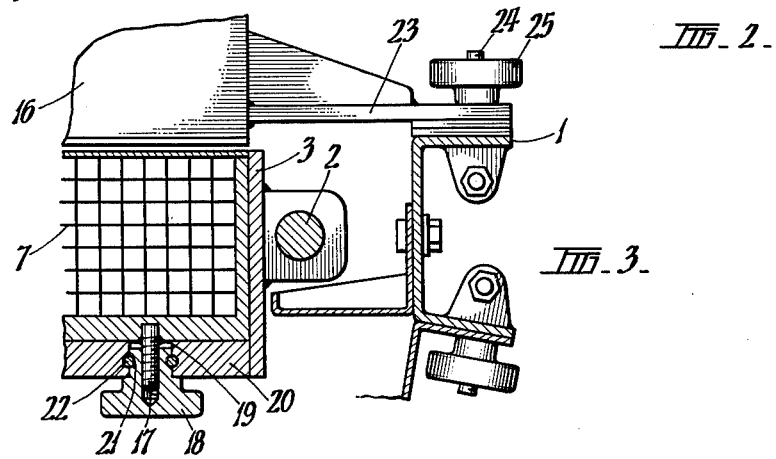
FIG. 3 is a part cross section taken on line 3—3 of FIG. 1.

In these views, 1 indicates the main frame of the mill, 2 horizontal guide rods supported thereby and 3 the cutter box which is slideable on said guide rods and is reciprocated by means of a coupling rod 4, the latter being driven at controlled speed by any suitable means such as a gear box and variable speed gear. The cutter box has an open forward end 5, a closed rear end 6, a centrally arranged cutter grid 7, an open top 8 forwardly of the cutter grid, a floor 9 also forwardly of the cutter grid, a closed top 10 forwardly and rearwardly of the cutter grid and an open bottom 11 also rearwardly of the cutter grid.

The cutter grid 7 co-acts with a smooth surface stainless steel back plate 12 of such size that the open forward end 5 and the floor 9 of the cutter box slide freely past it, the top of back plate 12 being positioned to permit passing closely thereover the portion of top plate 10 which is forward of the cutter grid 7. The plate 12 is supported by a frame 13 pivoted at 14 to lugs 15 on the main frame 1. The pivoted frame 13 also supports the lower section 16 of the curd delivery chute which delivers the curd into the forward end of the cutter box in advance of the cutter grid 7 through the open top 8.

The cutter grid 7 is made from stainless steel and is preferably removably mounted in the cutter box 3. In the constructions shown, the cutter grid has two downwardly extending screwthreaded studs 17 engaging internally screwthreaded hand-nuts 18 rotatable in recesses 19 in a cross piece 20 extending across the underside of the cutter box. Each hand-nut has an annular groove 21 receiving dowel pins 22 which, while retaining the hand-nuts in the recesses 19, permit free rotation of the hand-nuts.

Rotation of the hand-nuts in one direction clamps the cutter grid 7 securely in position while rotation in the other direction upwardly ejects the cutter grid so that it can be readily removed for cleaning.

The cutter grid 7 is so arranged that, in the reciprocating movement of the cutter box, it stops a small distance (say about 1/32") short of the smooth surface stainless steel back plate 12 against which the slab of curd to be cut rests while the portion of top plate 10 which overhangs the cutter grid 7 passes closely over the top of plate 12, the members 10 and 12 coacting to shear the curd across its entire cross section. This differs from previous constructions of curd mills wherein a wooden block is used instead of the back plate 12 and the cutter grid hits against the wooden block, the curd being cut by being squeezed against the surface of the wooden block which rapidly becomes roughened and grooved under the pounding of the cutter grid.

The above construction gives many advantages. Firstly, the blades of the cutter grid remain sharp over longer periods, giving cleaner cutting of the curd without tearing and the curd is not squeezed and bruised against a rough surface. This reduces very considerably losses of fat which tend to leak from bruised or torn curd. Moreover, the smooth stainless steel back plate can be readily cleaned so that contamination of the curd by undesirable micro-organisms and products of fermentation is prevented. This is one of the most undesirable features of the wooden blocks previously used as the stopping surface, which became quickly grooved or indented and saturated with fat and curd particles, could not be adequately cleaned.

The construction of the cutter grid from stainless steel and its mounting so as to be readily removable is also an advantage in regard to cleaning and the maintenance of hygienic conditions in the mill. Replacement of the cutter grid or its blades in the event of damage is also facilitated.

The mounting of the back plate 12 on the pivoted frame 13 is also a great advantage as the back plate with the lower section of the curd chute can be bodily swung upwardly to enable the surface of the back plate to be easily cleaned.

The pivoted frame 13 may be secured during use of the mill by any suitable means such as slotted lugs 23 receiving pivoted bolts 24 on the main frame 1, the bolts having tightening hand-nuts 25.

What I claim is:

1. A cheese curd mill including a frame, a delivery chute mounted upon said frame, a cutter box having a top plate member closing a rear portion thereof, means for slidably mounting said cutter box upon said frame for horizontal movement, means reciprocating said cutter box between two fixed positions, a cutter grid means mounted in an intermediate portion of said cutter box having a top member thereof in alignment with said top plate and extending forwardly of a cutter grid, a vertical smooth surfaced metal back plate separate from said delivery chute, means removeably mounting said plate to said frame at a position slightly spaced from one of said positions and outside the path of travel of said cutter grid so that the cutter grid stops a small distance short of the back plate, said back plate also being positioned so that the top member of said cutter grid means passes thereover whereby to shear the entire cross section of curd positioned between the back plate of said cutter grid.

2. A cheese curd mill according to claim 1 wherein said cutter box has a cross-piece extending across the underside thereof and wherein there are provided recesses in said cross-piece, internally screwthreaded hand-nuts rotatably mounted in said recesses, screwthreaded studs downwardly extending from said cutter grid and engageable with said screwthreaded hand-nuts, a groove in said recess, an adjacent annular groove in said hand-nuts and a pin member disposed in said adjacent grooves for retaining the hand-nuts in the recesses but permitting free rotation of the screwthreaded hand-nuts to engage the screwthreaded studs.

3. A cheese curd mill as claimed in claim 1 wherein said back plate is pivotably mounted on said frame so that said back plate can be swung upwardly to enable the surface of the back plate to be cleaned.

References Cited by the Examiner
UNITED STATES PATENTS

| | | | |
|---|---|---|---|
| 528,521 | 11/1894 | Barnard | 31—48 |
| 1,656,415 | 1/1928 | Breitkrentz | 31—25 X |

SAMUEL KOREN, *Primary Examiner.*

HUGH R. CHAMBLEE, *Examiner.*